(12) United States Patent
Iwamura et al.

(10) Patent No.: US 11,812,015 B2
(45) Date of Patent: Nov. 7, 2023

(54) IMAGE ENCODING DEVICE, IMAGE DECODING DEVICE AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 227 days.

(21) Appl. No.: 17/205,267

(22) Filed: Mar. 18, 2021

(65) Prior Publication Data

US 2021/0235081 A1 Jul. 29, 2021

Related U.S. Application Data

(63) Continuation of application No. PCT/JP2019/035813, filed on Sep. 12, 2019.

(30) Foreign Application Priority Data

Sep. 21, 2018 (JP) .................................. 2018-178123

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/137* (2014.11); *H04N 19/159* (2014.11); *H04N 19/176* (2014.11)

(58) Field of Classification Search
CPC ... H04N 19/119; H04N 19/513; H04N 19/137
See application file for complete search history.

(56) References Cited

U.S. PATENT DOCUMENTS 9,374,598 B2 * 6/2016 Park ....................... H04N 19/44
10,931,963 B2 * 2/2021 Xu .......................... H04N 19/52
(Continued)

FOREIGN PATENT DOCUMENTS

JP 2018-113702 A 7/2018

OTHER PUBLICATIONS

MV Planar prediction; Iwamura; Jul. 2018. (Year: 2018).*
(Continued)

*Primary Examiner* — Luis Perez-Fuentes
(74) *Attorney, Agent, or Firm* — Studebaker & Brackett PC

(57) ABSTRACT

An image encoding device that divides an image into blocks and encodes on each of the blocks, the image encoding device includes: a sub-area divider configured to divide a target block to be encoded into a plurality of sub-areas; a reference direction determiner configured to determine a reference direction that indicates in which direction an encoded block to be referenced is located among encoded blocks around the target block; a motion vector deriver configured to derive a motion vector for each of the sub-areas by referencing a motion vector applied in inter prediction of an encoded block located in the determined reference direction; and a prediction image generator configured to generate a prediction image on the target block by performing inter prediction on each of the sub-areas by using the derived motion vector. The image encoding device configured to encode reference direction information that indicates the determined reference direction, and output a stream.

8 Claims, 12 Drawing Sheets

(51) Int. Cl.
*H04N 19/137* (2014.01)
*H04N 19/159* (2014.01)
*H04N 19/176* (2014.01)

(56) References Cited

U.S. PATENT DOCUMENTS

| | | | |
|---|---|---|---|
| 11,240,505 B2* | 2/2022 | Poirier | H04N 19/119 |
| 11,252,436 B2* | 2/2022 | Zhang | H04N 19/137 |
| 11,330,277 B2* | 5/2022 | Tsai | H04N 19/159 |
| 11,601,641 B2* | 3/2023 | Ko | H04N 19/176 |
| 2013/0279582 A1 | 10/2013 | Sugimoto et al. | |

OTHER PUBLICATIONS

High Efficiency Video Coding (HEVC)—Algorithms and Architechtures-, V. Sze, M. Budagavi, G. J. Sullivan, Springer, 2014.
Algorithm description for Versatile Video Coding and Test Model 2 (VTM 2), JVET-K1002, Oct. 2, 2018.
Iwamura, Shunsuke et al., CE4-2. 11: MVPlanar prediction, JVET-K0349-vl [online], Jul. 3, 2018, pp. 1-3.
Iwamura, Shunsuke et al., CE4-related: Angular merge prediction, JVET-L0411rl [online], Sep. 27, 2018, pp. 11-14.
International Search Report issued in PCT/JP2019/035813; dated Dec. 17, 2019.

* cited by examiner

ENCODING-TARGET CU

ENCODING-TARGET CU

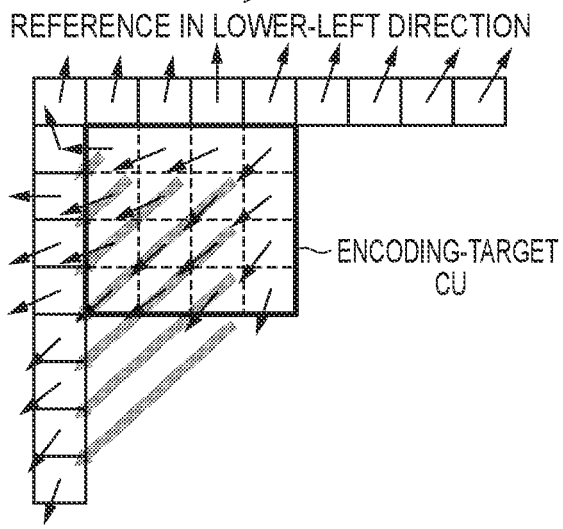
FIG. 5A REFERENCE IN LOWER-LEFT DIRECTION
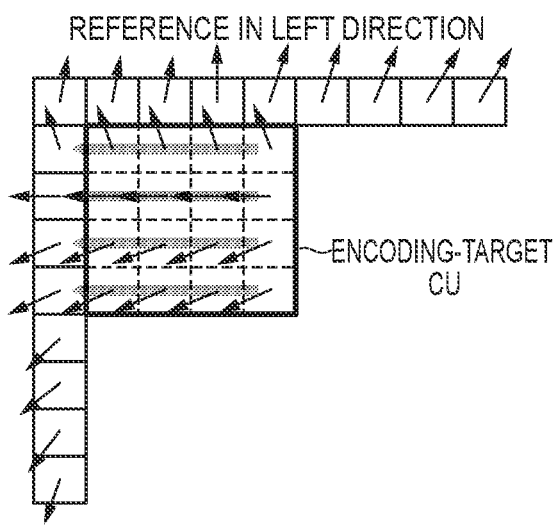
FIG. 5B REFERENCE IN LEFT DIRECTION
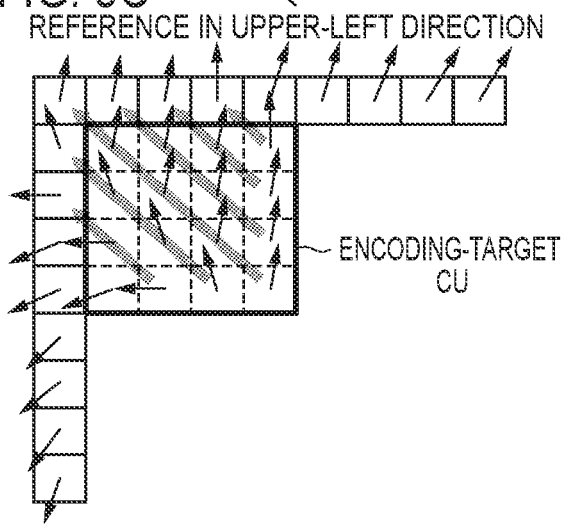
FIG. 5C REFERENCE IN UPPER-LEFT DIRECTION
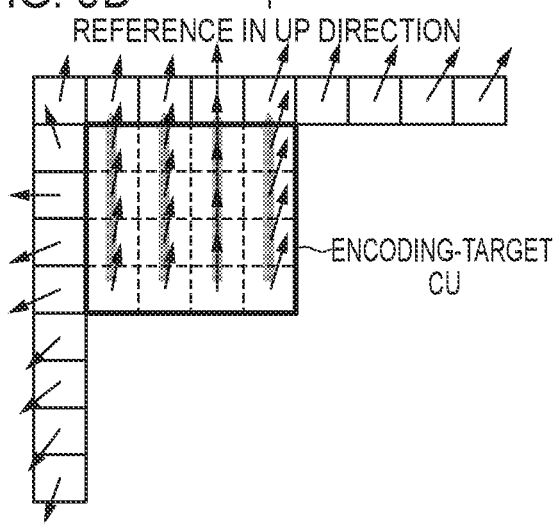
FIG. 5D REFERENCE IN UP DIRECTION
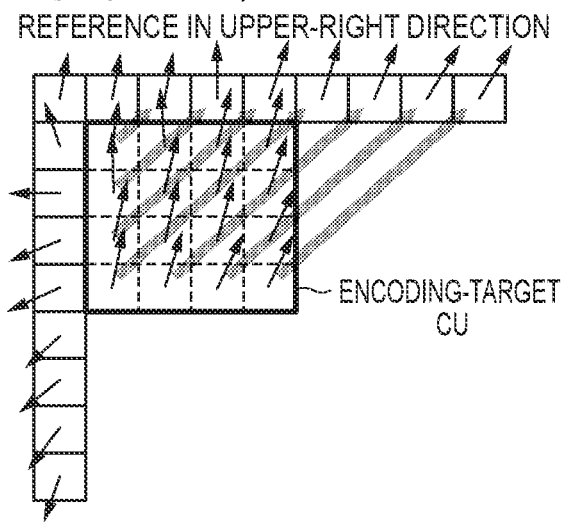
FIG. 5E REFERENCE IN UPPER-RIGHT DIRECTION

REFERENCE IN LOWER-LEFT DIRECTION

IMAGE ENCODING DEVICE, IMAGE DECODING DEVICE AND PROGRAM

RELATED APPLICATIONS

The present application is a continuation based on PCT Application No. PCT/JP2019/035813, filed on Sep. 12, 2019, which claims the benefit of Japanese Patent Application No. 2018-178123 filed on Sep. 21, 2018. The content of which is incorporated by reference herein in their entirety.

TECHNICAL FIELD

The present invention relates to an image encoding device, an image decoding device and a program.

BACKGROUND ART

An image encoding device based on a conventional moving image (video) encoding scheme is configured to: divide an original image into blocks; perform prediction on each of the blocks while switching between inter prediction, which utilizes temporal correlation between frames, and intra prediction, which utilizes spatial correlation in a frame; perform orthogonal transform, quantization, and entropy encoding on prediction residuals that represent errors of a prediction image obtained by the prediction; and thus output a stream.

In H.265/HEVC (High Efficiency Video Coding), which is one of such encoding schemes, a merge mode is introduced as a mode for derivation of a motion vector to be used for an inter prediction of an encoding-target block (CU: Coding Unit).

In the merge mode introduced here, a plurality of CUs adjacent to the left and the top of an encoding-target CU are referenced, a list of candidates is created based on motion vectors applied to the CUs in inter prediction mode, and an index indicating which motion vector in the list is used is encoded and transmitted, whereby a reduction in amount of information on motion vectors is achieved (see Non Patent Literature 1).

As an application of the merge mode, Non Patent Literature 2 proposes an Affine mode, in which two representative CUs are selected from among a plurality of neighboring blocks adjacent to an encoding-target CU, a rotation model is calculated by using motion vectors applied in inter prediction of the selected representative CUs, and the calculated rotation model is applied to the encoding-target CU.

Specifically, in the Affine mode, an encoding-target CU is divided into sub-areas of predefined N×N pixels (for example, 4×4 pixels), and a motion vector corresponding to a position of a sub-area is calculated for each of the sub-areas, based on the rotation model, whereby inter prediction using motion vectors that vary among the sub-areas in the encoding-target CU is achieved.

CITATION LIST

Non Patent Literature

Non Patent Literature 1: High Efficiency Video Coding (HEVC)-Algorithms and Architechtures-, V. Sze, M. Budagavi, G. J. Sullivan, Springer Non Patent Literature 2: "Algorithm description for Versatile Video Coding and Test Model 2 (VTM 2)," JVET-K1002

DISCLOSURE OF INVENTION

Technical Problem

However, the merge mode according to Non Patent Literature 1 has a problem that since inter prediction of an encoding-target CU is performed by using only one motion vector in the list of candidates based on a plurality of neighboring CUs, prediction accuracy is low for a complicated motion and at a border portion between two objects, so that encoding efficiency decreases when the merge mode is used in such areas.

In the Affine mode according to Non Patent Literature 2, since inter prediction using motion vectors that vary among sub-areas can be performed by using a plurality of motion vectors applied to neighboring CUs, a motion such as a rotation can be predicted with high accuracy. However, as in the merge mode, prediction accuracy is low at a border between objects, and the problem of a decrease in encoding efficiency cannot be solved.

Although prediction accuracy at a border between objects can be enhanced by finely dividing an encoding-target CU and then encoding, an amount of information increases, such as a flag indicating a form of division and a motion vector of each sub-block, and consequently a problem arises that encoding efficiency is lowered.

Accordingly, an object of the present invention is to provide an image encoding device, an image decoding device, and a program that can improve prediction accuracy in inter prediction, and can enhance encoding efficiency.

Solution to Problem

An image encoding device according to a first feature that divides an image into blocks and encodes on each of the blocks, the image encoding device includes: a sub-area divider configured to divide a target block to be encoded into a plurality of sub-areas; a reference direction determiner configured to determine a reference direction that indicates in which direction an encoded block to be referenced is located among encoded blocks around the target block; a motion vector deriver configured to derive a motion vector for each of the sub-areas by referencing a motion vector applied in inter prediction of an encoded block located in the determined reference direction; a prediction image generator configured to generate a prediction image on the target block by performing inter prediction on each of the sub-areas by using the derived motion vector; and an entropy encoder configured to encode reference direction information that indicates the determined reference direction, and output a stream.

In the first feature, the image encoding device further may include a reference motion vector acquirer configured to acquire a plurality of reference motion vectors including a motion vector applied in inter prediction of each of the encoded blocks located around the target block. For each one sub-area included in the plurality of sub-areas, the motion vector deriver may be configured to: identify, from among the plurality of reference motion vectors, a reference motion vector corresponding to an encoded block located in the reference direction relative to the one sub-area; and derive a motion vector for the one sub-area by extrapolation, by using the identified reference motion vector.

In the first feature, the entropy encoder may be configured to encode the reference direction information, without encoding a motion vector of each of the sub-areas, and output the stream.

In the first feature, the prediction image generator may be configured to: generate a prediction image on each of the sub-areas by performing inter prediction on each of the sub-areas; and generate a prediction image on the target block by combining the prediction image on each of the sub-areas.

An image decoding device according to a second feature is an image decoding device that decodes an encoded stream on each of blocks, the image decoding device includes: a sub-area divider configured to divide a target block to be decoded into a plurality of sub-areas; an entropy decoder configured to, by decoding the encoded stream, acquire a reference direction that indicates in which direction a decoded block to be referenced is located among decoded blocks around the target block; a motion vector deriver configured to derive a motion vector for each of the sub-areas by referencing a motion vector applied in inter prediction of a decoded block located in the acquired reference direction; and a prediction image generator configured to generate a prediction image on the target block by performing inter prediction on each of the sub-areas by using the derived motion vector.

In the second feature, the image decoding device, further may include a reference motion vector acquirer configured to acquire a plurality of reference motion vectors including a motion vector applied in inter prediction of each of the decoded blocks located around the target block. For each one sub-area included in the plurality of sub-areas, the motion vector deriver may be configured to: identify, from among the plurality of reference motion vectors, a reference motion vector corresponding to a decoded block located in the reference direction relative to the one sub-area; and derive a motion vector for the one sub-area by extrapolation, by using the identified reference motion vector.

In the second feature, the entropy decoder may be configured to acquire the reference direction from the encoded stream, without acquiring a motion vector of each of the sub-areas from the encoded stream.

In the second feature, the prediction image generator may be configured to: generate a prediction image on each of the sub-areas by performing inter prediction on each of the sub-areas; and generate a prediction image on the target block by combining the prediction image on each of the sub-areas.

A program according to a third feature causes a computer to function as the image encoding device according to the first feature.

A program according to a fourth feature causes a computer to function as the image decoding device according to the second feature.

Advantageous Effect of Invention

According to the present invention, an image encoding device, an image decoding device, and a program can be provided that can improve prediction accuracy in inter prediction, and can enhance encoding efficiency.

BRIEF DESCRIPTION OF DRAWINGS

FIG. 5A is a diagram illustrating an example of types of reference direction according to the embodiment.

FIG. 5B is a diagram illustrating an example of types of reference direction according to the embodiment.

FIG. 5C is a diagram illustrating an example of types of reference direction according to the embodiment.

FIG. 5D is a diagram illustrating an example of types of reference direction according to the embodiment.

FIG. 5E is a diagram illustrating an example of types of reference direction according to the embodiment.

DESCRIPTION OF EMBODIMENTS

An image encoding device and an image decoding device according to a present embodiment are described with reference to the accompanying drawings. The image encoding device and the image decoding device according to the present embodiment encode and decode videos such as MPEG videos. In the description of the drawings below, the same or similar reference signs are used for the same or similar parts.

<Image Encoding Device>

Figure 1:
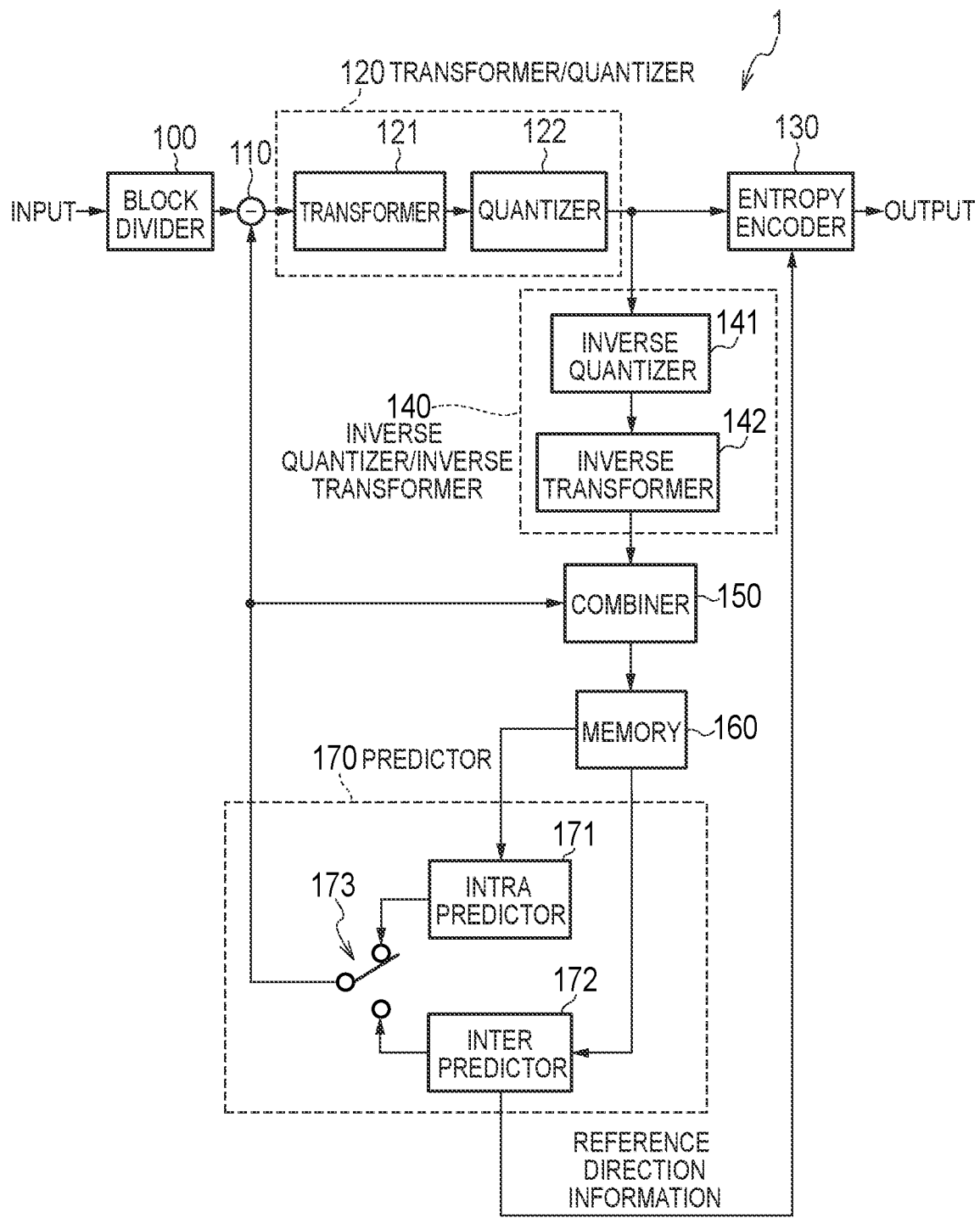
FIG. 1 is a diagram illustrating the configuration of an image encoding device according to an embodiment.

First, the image encoding device according to the present embodiment is described. FIG. 1 is a diagram illustrating a configuration of the image encoding device 1 according to the present embodiment.

As illustrated in FIG. 1, the image encoding device 1 includes a block divider 100, a subtractor 110, a transformer/quantizer 120, an entropy encoder 130, an inverse quantizer/inverse transformer 140, a combiner 150, a memory 160, and a predictor 170.

The block divider 100 divides an input image given in the form of a frame (or a picture) that constitutes a part of a video into a plurality of blocks and outputs the resulting blocks to the subtractor 110. The size of the blocks may be 32×32 pixels, 16×16 pixels, 8×8 pixels, or 4×4 pixels. The shape of the blocks is not limited to square and may be rectangular. A block is the unit of encoding by the image encoding device 1 and of decoding by the image decoding device. Hereinafter, such a block is referred to as a CU (Coding Unit).

The subtractor 110 calculates prediction residuals that represent differences (errors) between an encoding-target CU inputted from the block divider 100 and a prediction image obtained by the predictor 170 predicting the encoding-target CU. Specifically, the subtractor 110 calculates a prediction residual by subtracting each pixel value in the prediction image from each pixel value in the CU, and outputs the calculated prediction residuals to the transformer/quantizer 120.

The transformer/quantizer 120 executes an orthogonal transform process and a quantization process in units of the CU. The transformer/quantizer 120 includes a transformer 121 and a quantizer 122.

The transformer 121 calculates orthogonal transform coefficients by performing the orthogonal transform process on the prediction residuals inputted from the subtractor 110, and outputs the calculated orthogonal transform coefficients to the quantizer 122. Orthogonal transform is, for example, discrete cosine transform (DCT), discrete sine transform (DST), Karhunen Loeve transform (KLT), or the like.

The quantizer 122 quantizes the orthogonal transform coefficients inputted from the transformer 121 by using a quantization parameter (Qp) and a quantization matrix, and outputs the quantized orthogonal transform coefficients to the entropy encoder 130 and the inverse quantizer/inverse transformer 140. The quantization parameter (Qp) is a parameter that is applied in common to each orthogonal transform coefficient in a CU, and is a parameter that determines quantization granularity. The quantization matrix is a matrix that has, as elements, quantization values used when each orthogonal transform coefficient is quantized.

The entropy encoder 130 performs entropy encoding on the orthogonal transform coefficients inputted from the quantizer 122, generates an encoded stream (bit stream) by performing data compression, and outputs the encoded stream to an outside of the image encoding device 1. For the entropy encoding, Huffman coding, CABAC (Context-based Adaptive Binary Arithmetic Coding), or the like can be used. Note that control information related to prediction is inputted into the entropy encoder 130 from the predictor 170, and the entropy encoder 130 also performs entropy encoding on the inputted control information.

The inverse quantizer/inverse transformer 140 executes an inverse quantization process and an inverse orthogonal transform process in units of the CU. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the orthogonal transform coefficients inputted from the quantizer 122 by using the quantization parameter (Qp) and the quantization matrix to restore the orthogonal transform coefficients, and outputs the restored orthogonal transform coefficients to the inverse transformer 142.

The inverse transformer 142 performs the inverse orthogonal transform process corresponding to the orthogonal transform process performed by the transformer 121. For example, when the transformer 121 performs discrete cosine transform, the inverse transformer 142 performs inverse discrete cosine transform. The inverse transformer 142 restores the prediction residuals by performing the inverse orthogonal transform process on the orthogonal transform coefficients inputted from the inverse quantizer 141, and outputs restoration prediction residuals that are the restored prediction residuals to the combiner 150.

The combiner 150 combines the restoration prediction residuals inputted from the inverse transformer 142 with a prediction image inputted from the predictor 170, on a pixel-by-pixel basis. The combiner 150 reconstructs (decodes) an encoding-target CU by adding individual pixel values of the restoration prediction residuals to individual pixel values of the prediction image, and outputs a decoded image on each of decoded CUs to the memory 160. A decoded image is referred to as a reconstructed image in some cases.

The memory 160 stores the decoded image inputted from the combiner 150. The memory 160 stores decoded images in units of frames. The memory 160 outputs decoded images to the predictor 170. Note that a loop filter may be provided between the combiner 150 and the memory 160.

The predictor 170 performs prediction in units of the CU. The predictor 170 includes an intra predictor 171, an inter predictor 172 and a switcher 173.

The intra predictor 171 generates an intra prediction image by referencing decoded pixel values around an encoding-target CU of a decoded image stored in the memory 160, and outputs the generated intra prediction image to the switcher 173. The intra predictor 171 selects an optimal intra prediction mode to be applied to the target CU from among a plurality of intra prediction modes, and performs intra prediction by using the selected intra prediction mode. The intra predictor 171 outputs control information related to the selected intra prediction mode to the entropy encoder 130.

The inter predictor 172 calculates a motion vector through a scheme such as block matching by using, for a reference image, a decoded image stored in the memory 160, generates an inter prediction image by predicting an encoding-target CU, and outputs the generated inter prediction image to the switcher 173. The inter predictor 172 selects an optimal inter prediction method, from inter prediction using a plurality of reference images (typically, bi-prediction) and inter prediction using one reference image (uni-directional prediction), and performs inter prediction by using the selected inter prediction method. The inter predictor 172 outputs control information related to inter prediction to the entropy encoder 130.

The switcher 173 switches between the intra prediction image inputted from the intra predictor 171 and the inter prediction image inputted from the inter predictor 172, and outputs any one of the prediction images to the subtractor 110 and the combiner 150.

Figure 2:
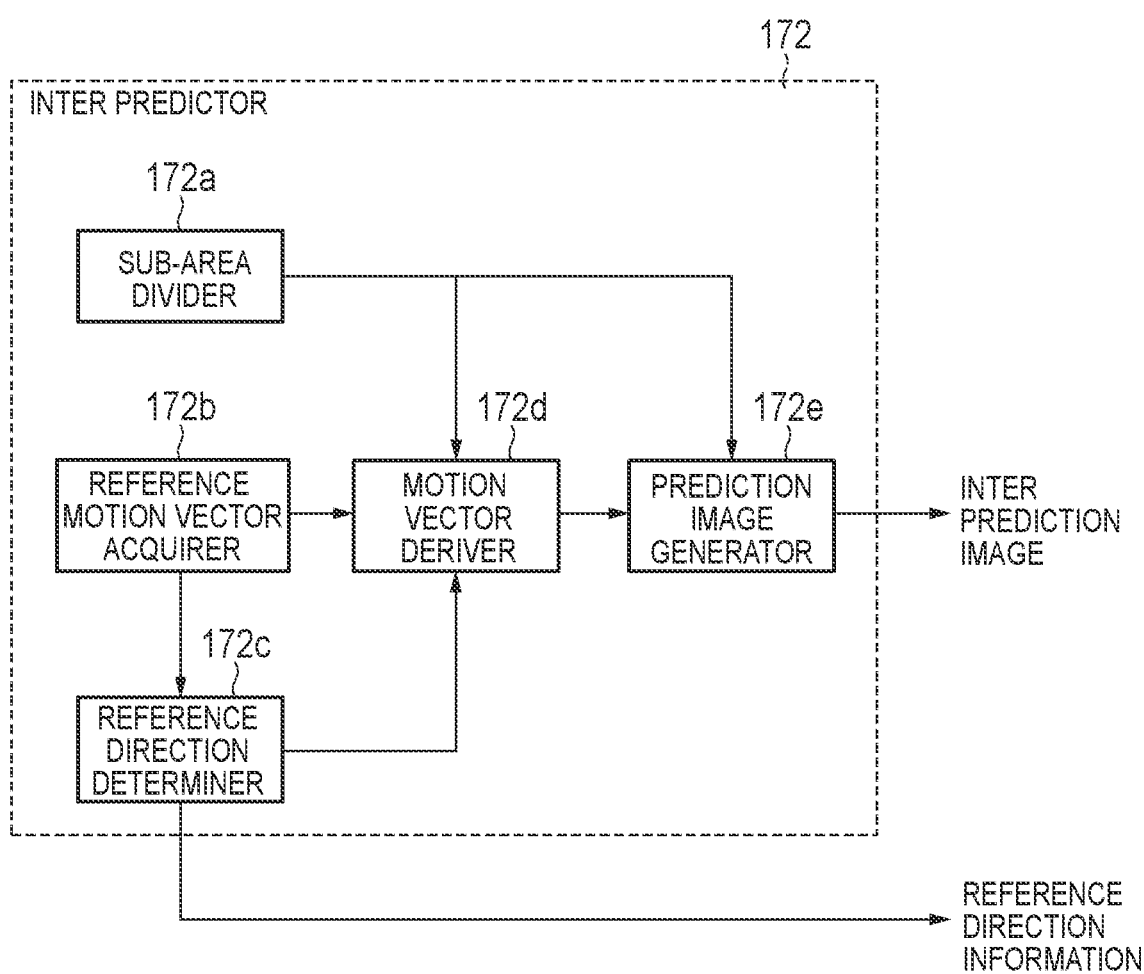
FIG. 2 is a diagram illustrating a configuration of an inter predictor of the image encoding device according to the embodiment.

Next, the inter predictor 172 of the image encoding device 1 is described. FIG. 2 is a diagram illustrating a configuration of the inter predictor 172 of the image encoding device 1.

As illustrated in FIG. 2, the inter predictor 172 includes a sub-area divider 172a, a reference motion vector acquirer 172b, a reference direction determiner 172c, a motion vector deriver 172d, and a prediction image generator 172e.

The sub-area divider 172a divides an encoding-target (prediction-target) CU into a plurality of sub-areas of a predefined size, and outputs information on each of the resulting sub-areas to the motion vector deriver 172d and the prediction image generator 172e. Such a sub-area may also be referred to as a sub-block.

Figure 3A:
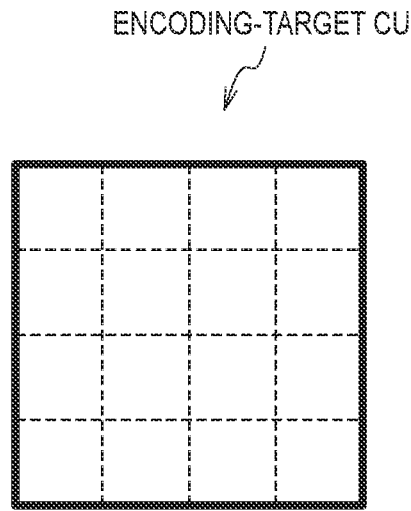
FIG. 3A is a diagram illustrating examples of a configuration of sub-areas according to the embodiment.
Figure 3B:
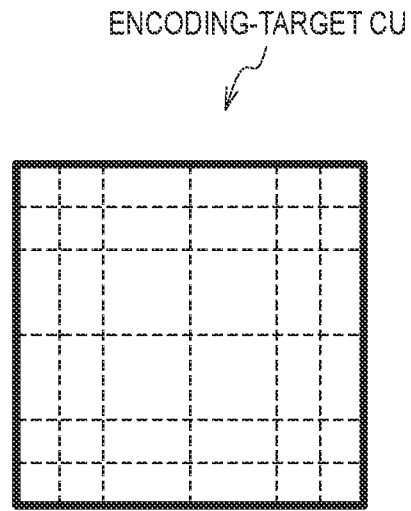
FIG. 3B is a diagram illustrating examples of a configuration of sub-areas according to the embodiment.

FIG. 3A and FIG. 3B is a diagram illustrating examples of a configuration of the sub-areas. As illustrated in FIG. 3A, the size of each sub-area may be identical, and for example, each sub-area may be configured to be an area of 4×4 pixels.

Alternatively, if a process common to the image decoding device and the image decoding device is predefined, the sizes of the individual sub-areas may be made different, as illustrated in FIG. 3B. For example, an encoding-target CU may be divided into sub-areas by a method that produces finer divisions near boundaries of the encoding-target CU and coarser divisions around a center.

The reference motion vector acquirer 172b acquires, as reference motion vectors, motion vectors applied in inter prediction of each encoded CU located around (to the top or the left of) the encoding-target CU, and outputs a list of the acquired reference motion vectors to the reference direction determiner 172c and the motion vector deriver 172d.

Figure 4A:
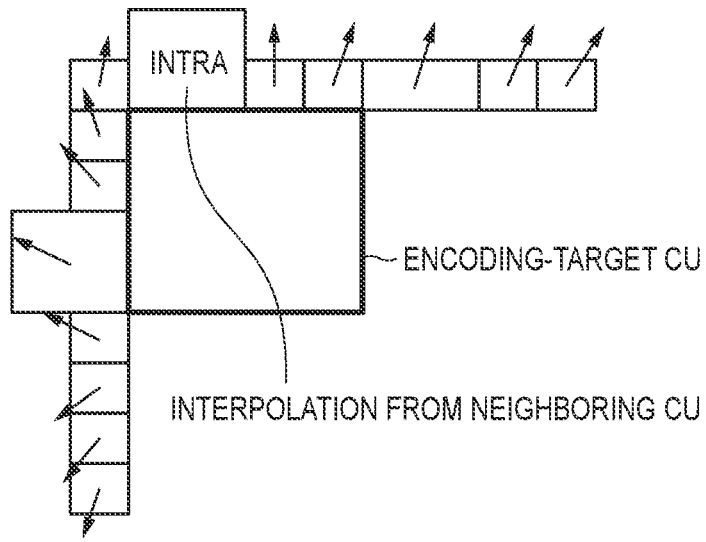
FIG. 4A is a diagram illustrating examples of a reference motion vector according to the embodiment.
Figure 4B:
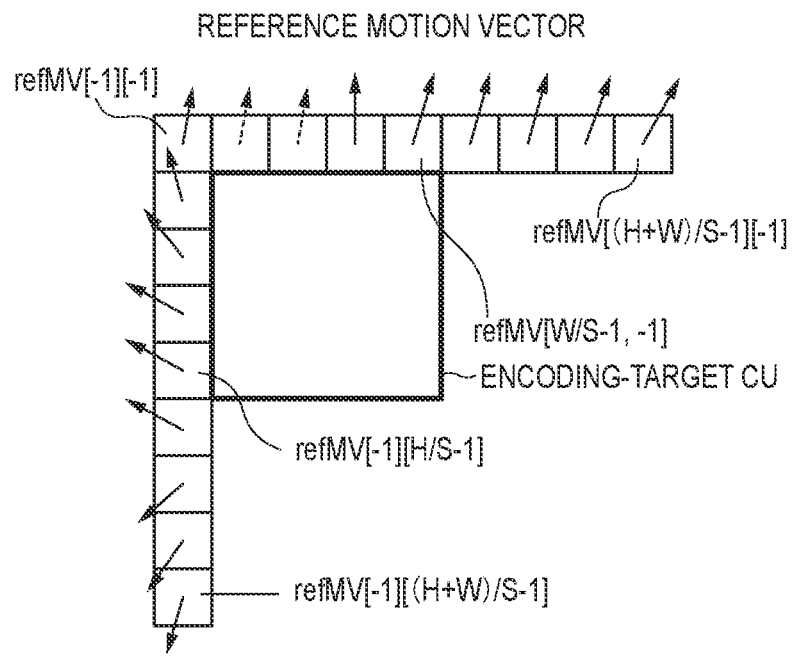
FIG. 4B is a diagram illustrating examples of a reference motion vector according to the embodiment.

FIG. 4A and FIG. 4B is a diagram illustrating examples of the reference motion vectors. As illustrated in FIG. 4A, when intra prediction is applied to one or some encoded CUs among encoded CUs located to the top and the left of an encoding-target CU, the reference motion vector acquirer 172b may interpolate a reference motion vector by using a motion vector applied to a CU adjacent to each of the one or some encoded CUs, or may interpolate a reference motion vector by calculating the reference motion vector, such as by calculating a weighted average of available neighboring motion vectors. Interpolation is also performed similarly when an encoding-target CU is on an edge of an image.

As illustrated in FIG. 4B, assuming that top-left coordinates of an encoding-target CU are (0, 0), a width and a height of the encoding-target CU is W and H, respectively, and a size of each sub-area (here, a case is described where a width and a height of a sub-area are equal, as an example) is S, a reference motion vector refMV is calculated as per following expressions (1).

$$refMV[-1][-1]=MV[-1][-1]$$

$$refMV[-1][n]=MV[-1][(n+1)*S-1] \ (n=0 \ldots (H+W)/S-1)$$

$$refMV[n][-1]=MV[(n+1)*S-1][-1] \ (n=0 \ldots (H+W)/S-1) \quad (1)$$

In the expressions (1), MV[x][y] represents a motion vector applied to a CU including a pixel located at (x, y) coordinates.

Note that a motion vector may include a temporal position (for example, a POC (Picture Order Count) or a reference index in a reference list) or the like of a picture to be referenced (reference image), in addition to vector values in horizontal and vertical directions of the motion vector.

The reference direction determiner 172c determines a reference direction that indicates in which direction an encoded CU to be referenced is located among encoded CUs located around the encoding-target CU, and outputs reference direction information indicating the determined reference direction to the motion vector deriver 172d and the entropy encoder 130. Specifically, the reference direction indicates that a reference motion vector located in which direction is used for extrapolation of a motion vector to be applied to a sub-area in the encoding-target CU.

For example, the reference direction determiner 172c determines a reference direction from among predefined candidates for the reference direction. FIG. 5A, FIG. 5B, FIG. 5C, FIG. 5D and FIG. 5E is a diagram illustrating an example of the candidates for the reference direction. As illustrated in FIGS. 5A to 5E, five types of reference direction are predefined as candidates for the reference direction.

Specifically, FIG. 5A illustrates "reference in a lower-left direction", FIG. 5B illustrates "reference in a left direction", FIG. 5C illustrates "reference in an upper-left direction", FIG. 5D illustrates "reference in an up direction", and FIG. 5E illustrates "reference in an upper-right direction".

In each of FIGS. 5A to 5B, a block enclosed by a thick line is an encoding-target CU, and blocks located to the left and the top of the encoding-target CU and respective motion vectors of the blocks are encoded CUs located around the encoding-target CU and motion vectors applied to the encoded CUs, respectively. In the example, it is assumed that interpolation processing is already performed for a case where a motion vector cannot be used, such as a case where intra prediction is applied.

The reference direction determiner 172c determines based on which reference direction, of the five types of reference direction, extrapolation is applied to the encoding-target CU. For example, the reference direction determiner 172c tries extrapolation based on each of all selectable reference directions, predicts the encoding-target CU by using generated motion vectors, performs orthogonal transform, quantization, and entropy encoding, calculates a rate distortion (RD) cost by linear combination of an amount of information generated and an amount of distortion from an original image, and determines a reference direction that leads to the smallest RD cost.

For a pre-process to calculate the RD cost, reference directions may be narrowed down, or may be determined, abbreviately by comparing statistical amounts of prediction residuals according to motion vectors obtained by extrapolation based on each tried reference direction. Reference directions may be determined by analyzing a feature amount such as an edge amount against an original image, or reference directions may be determined by analyzing statistical amounts of temporally and spatially neighboring motion vectors.

The motion vector deriver 172d derives a motion vector for each sub-area by referencing a reference motion vector applied in inter prediction of an encoded block located in the reference direction determined by the reference direction determiner 172c, and outputs the motion vector derived for each sub-area to the prediction image generator 172e. In the present embodiment, the motion vector deriver 172d extrapolates motion vectors to be applied to the individual sub-areas in the encoding-target CU by using reference motion vectors.

Figure 6:
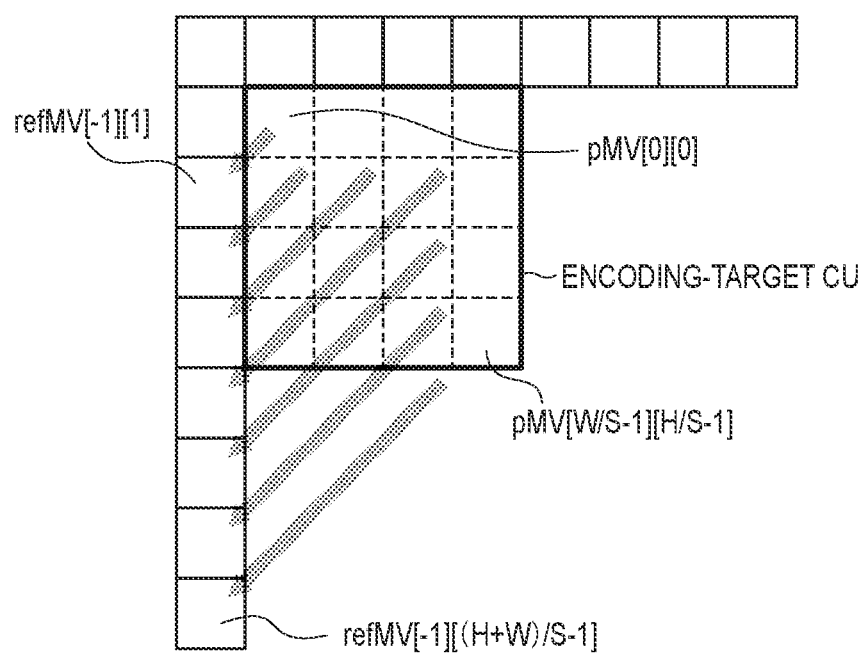
FIG. 6 is a diagram illustrating an example in a case where the reference direction is a lower-left direction, according to the embodiment.

FIG. 6 is a diagram illustrating an example in a case where the reference direction is a lower-left direction. In FIG. 6, it is assumed that "refMV" represents a reference motion vector and "pMV" represents an extrapolated motion vector to be applied to each sub-area. As illustrated in FIG. 6, when the reference direction is a lower-left direction, the motion vector deriver 172d calculates an extrapolated motion vector pMV as per a following expression (2):

$$pMV[x][y]=refMV[-1][x+y-1] \quad (2)$$

where x=0 ... W/S-1, y=0 ... H/S-1.

Regardless of the case where a motion vector to be applied to a sub-area is determined by copying one reference motion vector located in the reference direction, a motion vector to be applied to a sub-area may be calculated by calculating a weighted average of a plurality of reference motion vectors located in a vicinity of the reference direction. For example, the motion vector deriver 172d may calculate a motion vector pMV by using three reference motion vectors in a vicinity of the reference direction, as per a following expression (3).

$$pMV[x][y]=(refMV[-1][x+y-2]+refMV[-1][x+y-1]*2+refMV[-1][x+y])/4 \quad 3)$$

Figure 7:
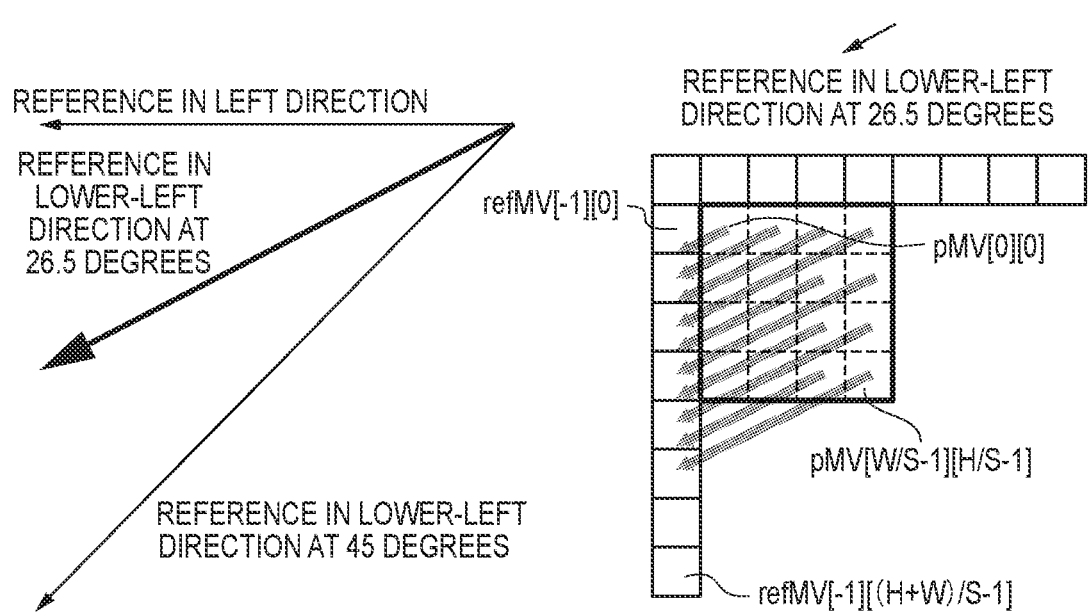
FIG. 7 is a diagram illustrating an example in which extrapolation is performed by reference in a lower-left direction at 26.5 degrees.

In the above example, a description is given by using an example in which the reference directions are a vertical direction, a horizontal direction, and a direction inclined at 45 degrees. However, angles may be set arbitrarily if a common process is performed by the image encoding device and the image decoding device. For example, in an example in which extrapolation is performed by reference in a lower-left direction at 26.5 degrees as illustrated in FIG. 7, the motion vector deriver 172d may calculate pMV[x][y], as per a following expression (4).

$$pMV[x][y] = \begin{cases} refMV[-1]\left[\dfrac{x+2y+1}{2}\right] & (\text{if mod}(x+2y,2) == 0) \\ \dfrac{\left(refMV[-1]\left[\dfrac{x+2y}{2}\right] + refMV[-1]\left[\dfrac{x+2y}{2}+1\right]\right)}{2} & (\text{if mod}(x+2y,2) == 1) \end{cases} \quad (4)$$

The prediction image generator 172e performs inter prediction on each of the sub-areas in the encoding-target CU by using the motion vector derived by the motion vector deriver 172d to generate a prediction image on the encoding-target CU, and outputs the generated prediction image (inter prediction image) to the switcher 173.

Specifically, the prediction image generator 172e generates a prediction image on each sub-area by performing inter prediction on each sub-area by using the motion vector derived for each sub-area by the motion vector deriver 172d. The prediction image generator 172e then generates a prediction image on the encoding-target CU by combining the prediction images on the individual sub-areas.

The generated prediction image is inputted to the subtractor 110 via the switcher 173, and the subtractor 110 outputs prediction residuals representing differences between the encoding-target CU and the prediction image to the transformer/quantizer 120. The transformer/quantizer 120 generates quantized orthogonal transform coefficients from the prediction residuals, and outputs the generated orthogonal transform coefficients to the entropy encoder 130.

The entropy encoder 130 performs entropy encoding on the reference direction information inputted from the reference direction determiner 172c together with the orthogonal transform coefficients inputted from the transformer/quantizer 120, and outputs a stream.

Figure 8:
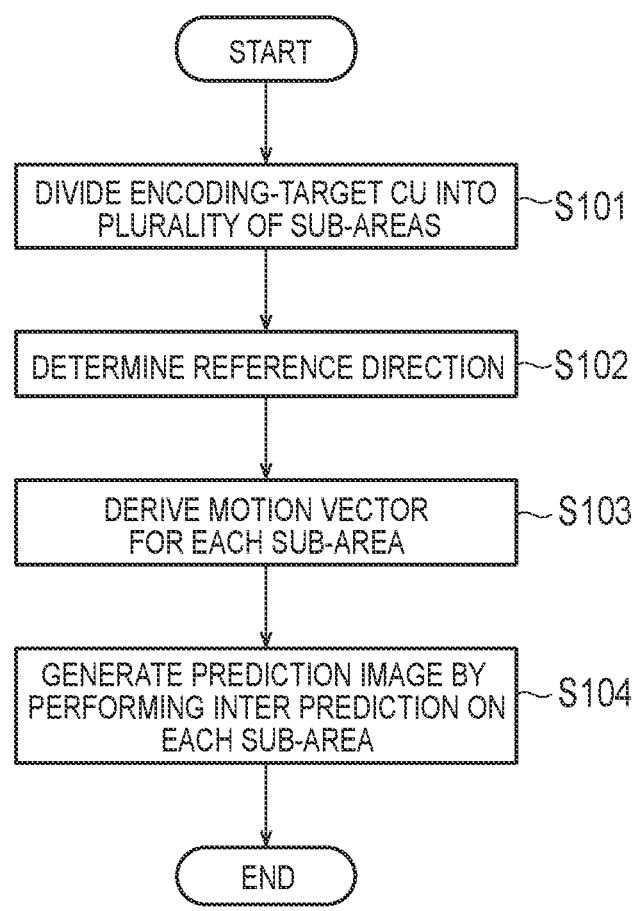
FIG. 8 is a diagram illustrating operation of the inter predictor of the image encoding device according to the embodiment.

Next, operation of the inter predictor 172 of the image encoding device 1 is described. FIG. 8 is a diagram illustrating the operation of the inter predictor 172 of the image encoding device 1.

As illustrated in FIG. 8, in step S101, the sub-area divider 172a divides an encoding-target CU into a plurality of sub-areas.

In step S102, the reference direction determiner 172c determines a reference direction that indicates in which direction an encoded block to be referenced is located among encoded blocks around the encoding-target CU.

In step S103, the motion vector deriver 172d derives a motion vector for each sub-area by referencing a motion vector applied in inter prediction of an encoded block located in the reference direction determined by the reference direction determiner 172c in step S102.

In step S104, the prediction image generator 172e generates a prediction image on the encoding-target CU by performing inter prediction on the individual sub-areas by using the motion vectors derived by the motion vector deriver 172d in step S103.

Note that the entropy encoder 130 encodes reference direction information indicating the reference direction determined by the reference direction determiner 172c in step S102, and outputs a stream.

As described above, according to the image encoding device 1 in the present embodiment, since finer inter prediction can be performed on each sub-area by using a motion vector that varies from sub-area to sub-area in an encoding-target CU, prediction accuracy can be improved for a complicated motion and at a border portion between two objects.

Moreover, since only one piece of reference direction information for an encoding-target CU may be included in an encoded stream, an amount of information to be transmitted can be reduced, compared to a case where a motion vector for each of the sub-areas in an encoding-target CU is included in an encoded stream.

<Image Decoding Device>

Figure 9:
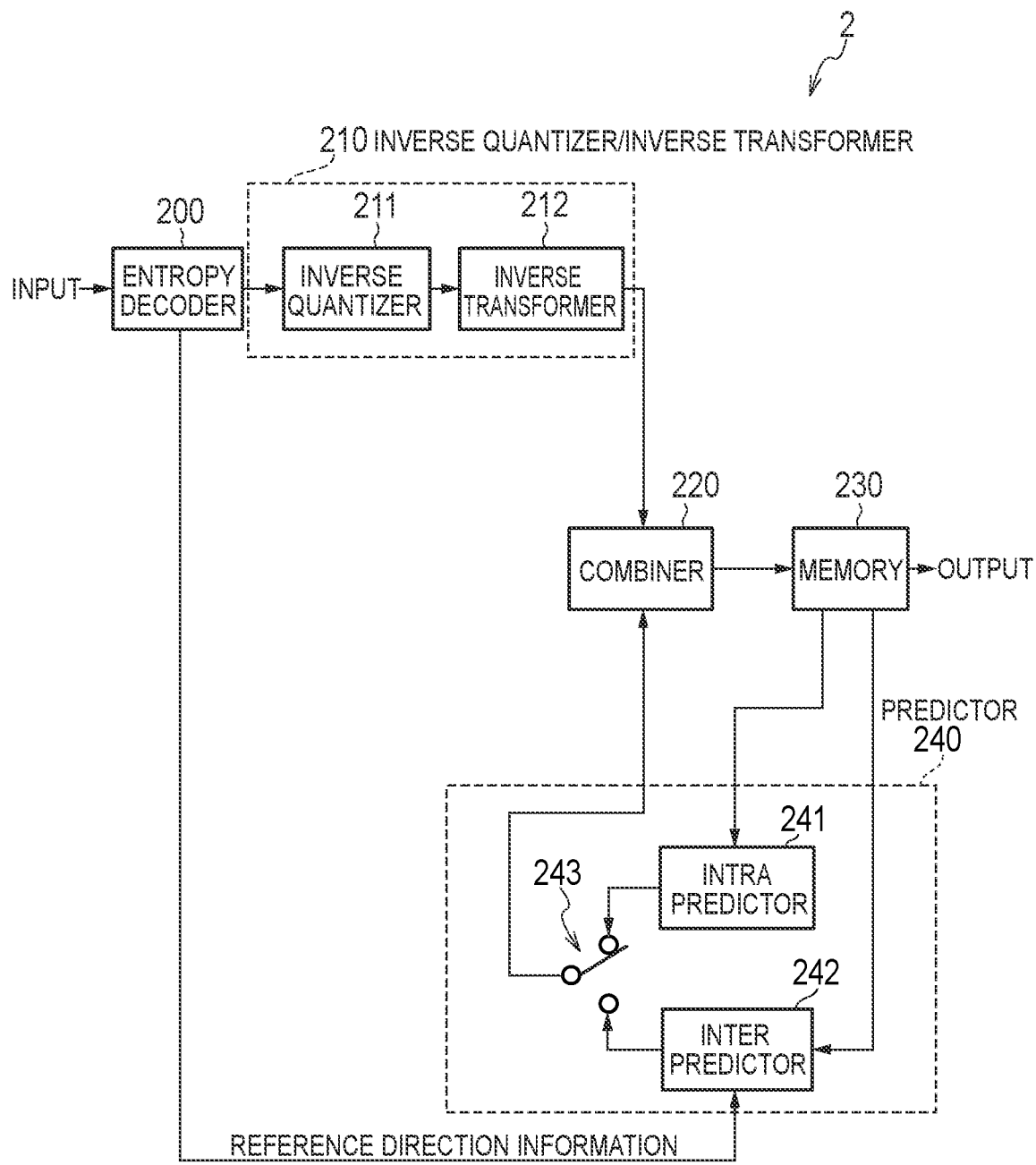
FIG. 9 is a diagram illustrating the configuration of an image decoding device according to the embodiment.

Next, the image decoding device according to the present embodiment is described. FIG. 9 is a diagram illustrating a configuration of the image decoding device 2 according to the present embodiment.

As illustrated in FIG. 9, the image decoding device 2 includes an entropy decoder 200, an inverse quantizer/inverse transformer 210, a combiner 220, a memory 230, and a predictor 240.

The entropy decoder 200 decodes an encoded stream generated by the image encoding device 1, and outputs quantized orthogonal transform coefficients to the inverse quantizer/inverse transformer 210. Moreover, the entropy decoder 200 acquires control information related to prediction (intra prediction and inter prediction), and outputs the acquired control information to the predictor 240.

In the present embodiment, the entropy decoder 200 decodes reference direction information included in the encoded stream, and outputs the decoded reference direction information to an inter predictor 242.

The inverse quantizer/inverse transformer 210 performs inverse quantization processing and inverse orthogonal transform processing in units of the CU. The inverse quantizer/inverse transformer 210 includes an inverse quantizer 211 and an inverse transformer 212.

The inverse quantizer 211 performs the inverse quantization process corresponding to the quantization process performed by the quantizer 122 of the image encoding device 1. The inverse quantizer 211 inverse quantizes the quantized orthogonal transform coefficients inputted from the entropy decoder 200 by using the quantization parameter (Qp) and the quantization matrix to restore orthogonal transform coefficients, and outputs the restored orthogonal transform coefficients to the inverse transformer 212.

The inverse transformer 212 performs the inverse orthogonal transform process corresponding to the orthogonal transform process performed by the transformer 121 of the image encoding device 1. The inverse transformer 212 restores prediction residuals by performing the inverse orthogonal transform process on the orthogonal transform coefficients inputted from the inverse quantizer 211, and outputs the restored prediction residuals (restoration prediction residuals) to the combiner 220.

The combiner 220 reconstructs (decodes) an original CU by combining the prediction residuals inputted from the inverse transformer 212 and a prediction image inputted from the predictor 240 on a pixel-by-pixel basis, and outputs a decoded image on each of CUs to the memory 230.

The memory 230 stores the decoded image inputted from the combiner 220. The memory 230 stores decoded images in units of frames. The memory 230 outputs the decoded images in units of frames to an outside of the image decoding device 2. Note that a loop filter may be provided between the combiner 220 and the memory 230.

The predictor 240 performs prediction in units of the CU. The predictor 240 includes the intra predictor 241, an inter predictor 242, and a switcher 243.

The intra predictor 241 references a decoded image stored in the memory 230, generates an intra prediction image by performing intra prediction in accordance with the control information inputted from the entropy decoder 200, and outputs the generated intra prediction image to the switcher 243.

The inter predictor 242 performs inter prediction that predicts a prediction-target CU by using, for a reference image, a decoded image stored in the memory 230. The inter predictor 242 generates an inter prediction image by performing inter prediction in accordance with the control information inputted from the entropy decoder 200, and outputs the generated inter prediction image to the switcher 243.

The switcher 243 switches between the intra prediction image inputted from the intra predictor 241 and the inter prediction image inputted from the inter predictor 242, and outputs any one of the prediction images to the combiner 220.

Figure 10:
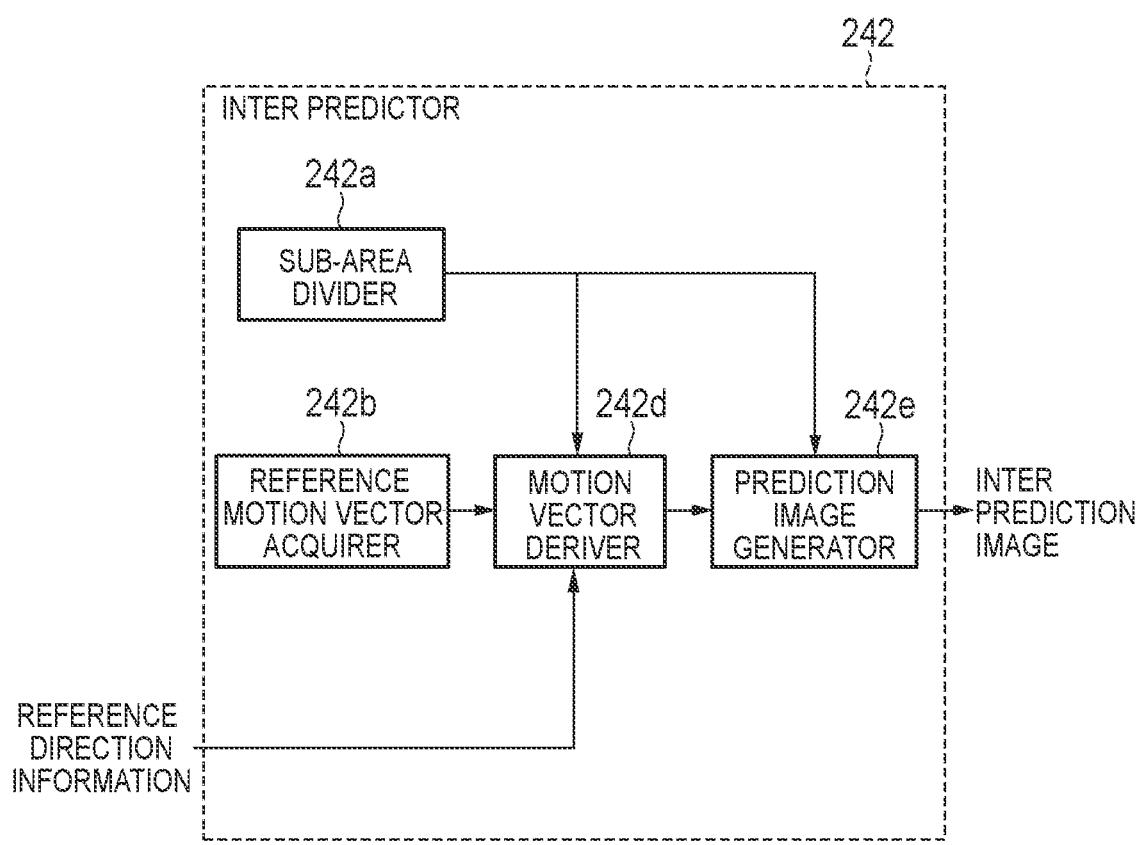
FIG. 10 is a diagram illustrating the configuration of the inter predictor an image decoding device according to the embodiment.

Next, the inter predictor 242 of the image decoding device 2 is described. FIG. 10 is a diagram illustrating a configuration of the inter predictor 242 of the image decoding device 2. Here, a description of operations that overlap with the operations of the inter predictor 172 of the image encoding device 1 is omitted as appropriate.

As illustrated in FIG. 10, the inter predictor 242 includes a sub-area divider 242a, a reference motion vector acquirer 242b, a motion vector deriver 242d, and a prediction image generator 242e.

The sub-area divider 242a divides a decoding-target (prediction-target) CU into a plurality of sub-areas of a predefined size, and outputs information on each of the resulting sub-areas to the motion vector deriver 242d and the prediction image generator 242e.

The reference motion vector acquirer 242b acquires, as reference motion vectors, motion vectors applied in inter prediction of each decoded CU located around (to the top and the left of) the decoding-target CU, and outputs a list of the acquired reference motion vectors to the motion vector deriver 242d.

The motion vector deriver 242d derives a motion vector for each sub-area by referencing, based on the reference direction information inputted from the entropy decoder 200, a reference motion vector applied in inter prediction of a decoded block located in a reference direction determined by the image encoding device 1, and outputs the motion vector derived for each sub-area to the prediction image generator 242e.

The prediction image generator 242e performs inter prediction on each of the sub-areas in the decoding-target CU by using the motion vector derived by the motion vector deriver 242d to generate a prediction image on the decoding-target CU, and outputs the generated prediction image (inter prediction image) to the switcher 243.

Specifically, the prediction image generator 242e generates a prediction image on each sub-area by performing inter prediction on each sub-area by using the motion vector derived for each sub-area by the motion vector deriver 242d. The prediction image generator 172e then generate a prediction image on the decoding-target CU by combining the prediction images on the individual sub-areas.

The generated prediction image is inputted to the combiner 220 via the switcher 243, and the combiner 220 reconstructs (decodes) an original CU by combining the prediction residuals inputted from the inverse transformer 212 and the prediction image on a pixel-by-pixel basis, and outputs a decoded image on each of CUs to the memory 230.

Figure 11:
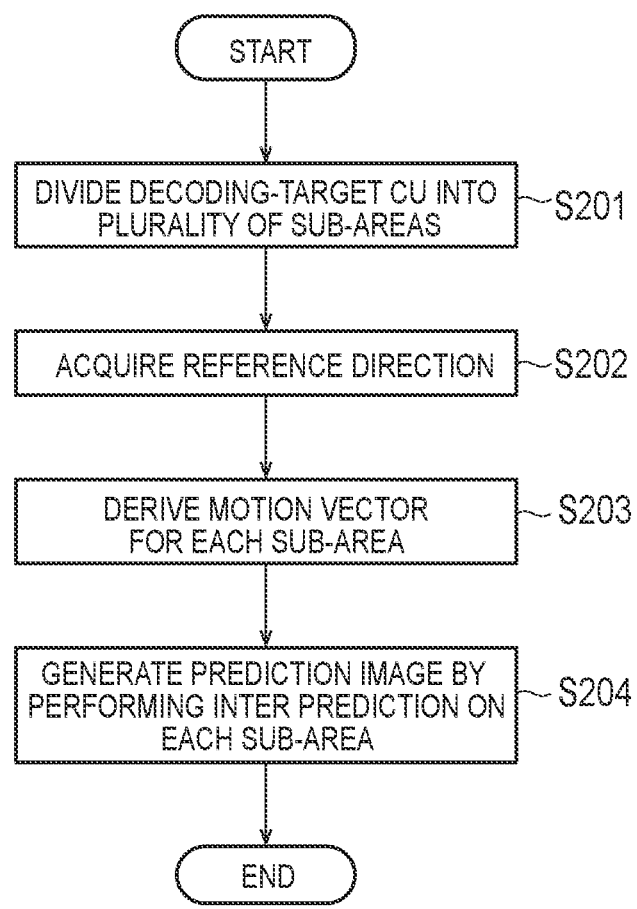
FIG. 11 is a diagram illustrating operation of the inter predictor an image decoding device according to the embodiment.

Next, operation of the inter predictor 242 of the image decoding device 2 is described. FIG. 11 is a diagram illustrating the operation of the inter predictor 242 of the image decoding device 2.

As illustrated in FIG. 11, in step S201, the sub-area divider 242a divides a decoding-target CU into a plurality of sub-areas.

In step S202, the motion vector deriver 242d acquires a reference direction determined by the image encoding device 1, based on reference direction information decoded by the entropy decoder 200.

In step S203, the motion vector deriver 242d derives a motion vector for each sub-area by referencing a motion vector applied in inter prediction of a decoded block located in the reference direction acquired in step S202.

In step S204, the prediction image generator 242e generates a prediction image on the decoding-target CU by performing inter prediction on the individual sub-areas by using the motion vectors derived by the motion vector deriver 242d in step S203.

As described above, according to the image decoding device 2 in the present embodiment, since finer inter prediction can be performed on each sub-area by using a motion vector that varies from sub-area to sub-area in a decoding-target CU, prediction accuracy can be improved for a complicated motion and at a border portion between two objects.

OTHER EMBODIMENTS

Figure 12:
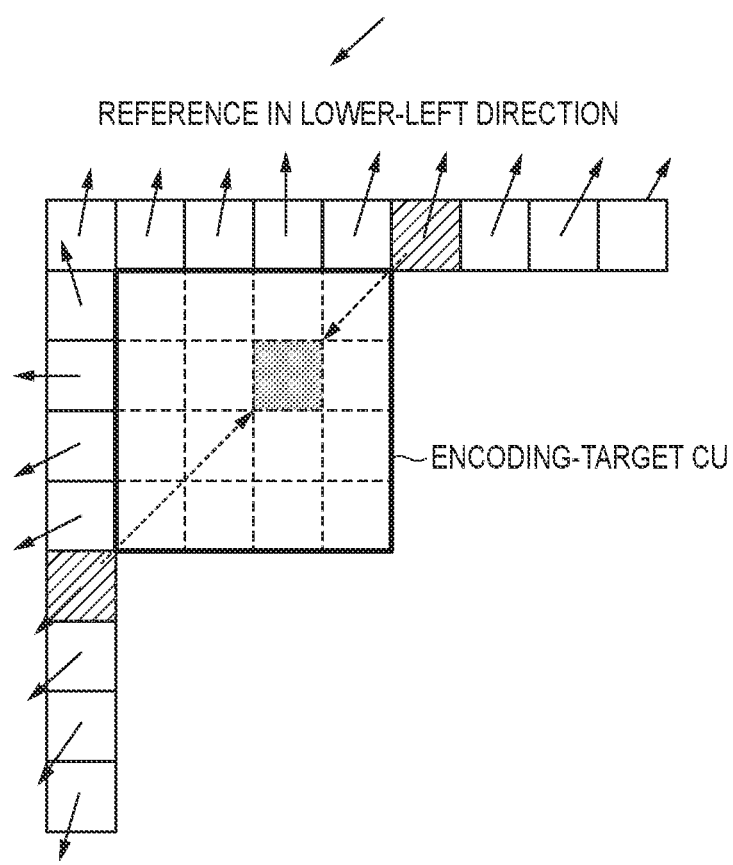
FIG. 12 is a diagram illustrating a method for deriving a motion vector according to another embodiment.

In the above-described embodiment, an example is described in which a motion vector to be applied to each sub-area in an encoding-target CU is extrapolated by using a reference motion vector. However, as illustrated in FIG. 12, a motion vector to be applied to a sub-area may be interpolated by using two or more reference motion vectors. In an example illustrated in FIG. 12, in which the reference direction is a lower-left direction, a sub-area references a reference motion vector applied to a CU in the lower-left direction, and the sub-area also further references a reference motion vector applied to a CU in an upper-right direction. The reference motion vectors are weighted according to a distance between the CU in the lower-left direction and the sub-area and a distance between the CU in the upper-right direction and the sub-area, and a motion vector to be applied to the sub-area is interpolated.

A program may be provided to cause a computer to execute the operations of the image encoding device 1 and a program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The image encoding device 1 may be embodied as a semiconductor integrated circuit (chipset, SoC, etc.) by integrating the circuits that execute the respective operations of the image encoding device 1. Similarly, the image decoding device 2 may be embodied as a semiconductor integrated circuit (chipset, SoC, etc.) by integrating the circuits that execute the respective operations of the image decoding device 2.

The embodiments have been described in detail above with reference to the drawings. Specific configurations are not limited to the above-described configurations, and various design changes, and the like are possible within the scope not deviating from the gist.

The invention claimed is:

1. An image encoding device that divides an image into blocks and encodes on each of the blocks, the image encoding device comprising:
    a sub-area divider configured to divide a target block to be encoded into a plurality of sub-areas;
    a reference direction determiner configured to determine a reference direction that indicates in which direction an encoded block to be referenced is located among encoded blocks around the target block;
    a motion vector deriver configured to derive a motion vector for each of the sub-areas by referencing a motion vector applied in inter prediction of an encoded block located in the determined reference direction;
    a prediction image generator configured to generate a prediction image on the target block by performing inter prediction on each of the sub-areas by using the derived motion vector; and
    an entropy encoder configured to encode reference direction information that indicates the determined reference direction, and output a stream, wherein
    the prediction image generator is configured to:
    generate sub prediction images each corresponding to each of the sub-areas by performing the inter prediction for each of the sub-areas; and
    generate the prediction image on the target block by combining the sub prediction images.

2. The image encoding device according to claim 1, further comprising a reference motion vector acquirer configured to acquire a plurality of reference motion vectors including a motion vector applied in inter prediction of each of the encoded blocks located around the target block, wherein
    the motion vector deriver is configured to:
    identify, from among the plurality of reference motion vectors, a reference motion vector corresponding to an encoded block located in the reference direction relative to the one sub-area, for each one sub-area included in the plurality of sub-areas; and
    derive a motion vector for the one sub-area by extrapolation, by using the identified reference motion vector.

3. The image encoding device according to claim 1, wherein the entropy encoder is configured to encode the reference direction information, without encoding a motion vector of each of the sub-areas, and output the stream.

4. An image decoding device that decodes an encoded stream on each of blocks, the image decoding device comprising:
    a sub-area divider configured to divide a target block to be decoded into a plurality of sub-areas;
    an entropy decoder configured to, by decoding the encoded stream, acquire a reference direction that indicates in which direction a decoded block to be referenced is located among decoded blocks around the target block;
    a motion vector deriver configured to derive a motion vector for each of the sub-areas by referencing a motion vector applied in inter prediction of a decoded block located in the acquired reference direction; and
    a prediction image generator configured to generate a prediction image on the target block by performing inter prediction on each of the sub-areas by using the derived motion vector, wherein
    the prediction image generator is configured to:
    generate sub prediction images each corresponding to each of the sub-areas by performing the inter prediction for each of the sub-areas; and
    generate the prediction image on the target block by combining the sub prediction images.

5. The image decoding device according to claim 4, further comprising a reference motion vector acquirer configured to acquire a plurality of reference motion vectors including a motion vector applied in inter prediction of each of the decoded blocks located around the target block, wherein
    the motion vector deriver is configured to:
    identify, from among the plurality of reference motion vectors, a reference motion vector corresponding to a decoded block located in the reference direction relative to the one sub-area, for each one sub-area included in the plurality of sub-areas; and
    derive a motion vector for the one sub-area by extrapolation, by using the identified reference motion vector.

6. The image decoding device according to claim 4, wherein the entropy decoder is configured to acquire the reference direction from the encoded stream, without acquiring a motion vector of each of the sub-areas from the encoded stream.

7. A non-transitory computer readable storage medium storing a program causing a computer to function as the image encoding device according to claim 1.

8. A non-transitory computer readable storage medium storing a program causing a computer to function as the image decoding device according to claim 4.

* * * * *